United States Patent
Kakutani

(10) Patent No.: US 8,842,340 B2
(45) Date of Patent: Sep. 23, 2014

(54) PRINTING SYSTEM AND PROGRAM FOR EXECUTING HALFTONE PROCESSING ON REPRESENTATIVE VALUES ASSIGNED TO PIXEL GROUP

(71) Applicant: Seiko Epson Corporation, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 13/685,061

(22) Filed: Nov. 26, 2012

(65) Prior Publication Data

US 2013/0135685 A1 May 30, 2013

(30) Foreign Application Priority Data

Nov. 30, 2011 (JP) ................. 2011-262643

(51) Int. Cl.
*H04N 1/405* (2006.01)
*H04N 1/409* (2006.01)

(52) U.S. Cl.
CPC ............. *H04N 1/405* (2013.01); *H04N 1/4092* (2013.01)
USPC .......... 358/3.06; 358/1.9; 358/3.02; 358/3.13

(58) Field of Classification Search
None
See application file for complete search history.

(56) References Cited

U.S. PATENT DOCUMENTS

| | | | | |
|---|---|---|---|---|
| 6,870,640 | B1* | 3/2005 | Fan et al. | 358/3.02 |
| 7,480,063 | B2* | 1/2009 | Kakutani | 358/1.1 |
| 7,554,691 | B2* | 6/2009 | Kakutani | 358/1.9 |
| 7,612,911 | B2 | 11/2009 | Kakutani | |
| 7,656,558 | B2* | 2/2010 | Kakutani | 358/3.1 |
| 7,710,605 | B2* | 5/2010 | Yamamoto | 358/3.13 |
| 7,733,535 | B2* | 6/2010 | Plunkett et al. | 358/3.14 |
| 7,813,007 | B2 | 10/2010 | Kakutani | |
| 2002/0075278 | A1* | 6/2002 | Kakutani | 345/600 |
| 2006/0012661 | A1* | 1/2006 | Lee et al. | 347/135 |
| 2006/0285165 | A1* | 12/2006 | Kakutani | 358/3.06 |
| 2013/0135684 | A1* | 5/2013 | Kakutani | 358/3.06 |

FOREIGN PATENT DOCUMENTS

JP 2004-289274 A 10/2004
JP 2006-005899 A 1/2006

* cited by examiner

*Primary Examiner* — Dung Tran
(74) *Attorney, Agent, or Firm* — Global IP Counselors, LLP

(57) ABSTRACT

A host computer groups a plurality of pixels to generate pseudo pixels, assigns representative values in an RGB format to the pseudo pixels, and transfers the representative values to a printer. Further, the host computer performs halftone processing and transfers generated dot data to the printer for pixels constituting the pseudo pixel which includes edges therein or of which boundary is the edge. The printer performs printing by using the transferred dot data and the representative values.

8 Claims, 6 Drawing Sheets

PRINTING SYSTEM AND PROGRAM FOR EXECUTING HALFTONE PROCESSING ON REPRESENTATIVE VALUES ASSIGNED TO PIXEL GROUP

BACKGROUND

1. Technical Field

The present invention relates to a system which performs printing.

2. Related Art

A printing device typically performs printing based on data (dot data) indicating presence/absence of dot formation for each pixel. The dot data is typically generated by converting image data in an RGB format. As the resolution of an image increases, the time required for the conversion increases.

Then, known is a technique of grouping a plurality of pixels and performing processing in accordance with presence/absence of an edge in each group so as to reduce the time required for conversion. The edge referred to herein indicates a borderline generated by sharp change of color or brightness. In this technique, the conversion is performed for a group including the edge in the existing manner, while information is compressed and the conversion is performed for a group including no edge. The conversion is typically executed by a host device (computer) which communicates with a printer. Dot data generated by the conversion is transferred from the host device to the printer as data for printing. The printer performs printing based on the transferred dot data (for example, JP-A-2004-289274).

In the above-mentioned existing technique, an object that both the reduction in the time required for transferring data for printing to the printer and the suppression of deterioration of print image quality are achieved at the same time has left unsolved. In particular, in recent years, a condition in which the time required for transferring data from the host device to the printer corresponds to a rate-controlling factor for print processing has been generated due to improvement of a conversion speed to dot data by the host device and improvement of a paper feeding speed by a line printer. Therefore, a data transfer time needs to be reduced. It is needless to say that the data transfer time can be reduced easily by lowering the resolution. However, image quality is deteriorated if the resolution is lowered. In this manner, there has been an object that both the reduction in the time required for transferring data to the printer and the suppression of deterioration of print image quality are achieved at the same time.

SUMMARY

An advantage of some aspects of the invention is to solve at least a part of the above-mentioned issues and therefore it can be realized in the following modes or Application Examples.

APPLICATION EXAMPLE 1

In a printing system including a host device and a printer which performs printing by using dot data indicating presence/absence of dot formation for each pixel, the host device includes a pseudo pixel generating portion which groups a plurality of pixels to generate pseudo pixels, an assigning portion which assigns representative values to which color specification values of pixels constituting the pseudo pixels are reflected to the respective pseudo pixels including no edge in the pseudo pixels, a host halftone processor which executes halftone processing on the pixels constituting the pseudo pixels including the edges in the pseudo pixels to generate the dot data, and a transfer portion which transfers the representative values assigned by the assigning portion and the dot data generated by the host halftone processor to the printer, and the printer includes a printer halftone processor which executes halftone processing on the representative values transferred from the host device to generate the dot data, and a printing portion which performs printing by using the dot data generated by the printer halftone processor and the dot data transferred from the host device.

With the printing system, reduction in the time required for transferring data for printing and suppression of deterioration of print image quality can be achieved at the same time. In the printing system, for the pseudo pixels including no edge, not dot data but the representative values are transferred. The representative value is data for the pseudo pixel of which resolution has been made lower since the pseudo pixel is constituted by a plurality of pixels. Therefore, a data amount of the representative value is smaller than that of the dot data. Accordingly, the data amount to be transferred from the host device to the printer can be made smaller. This makes it possible to reduce the time required for transferring data eventually.

There is no much difference in the image quality between printing of the pseudo pixels including no edge by using the representative values and printing thereof by using color specification values of the respective pixels because they include no edge. Therefore, with the printing system, reduction in the time required for transferring data for printing and suppression of deterioration of the image quality can be achieved at the same time.

APPLICATION EXAMPLE 2

In the printing system according to Application Example 1, it is preferable that the assigning portion assign the representative values to the respective pseudo pixels including the edges in the pseudo pixels in addition to the pseudo pixels including no edge in the pseudo pixels among the pseudo pixels, the transfer portion transfer the representative values assigned to the pseudo pixels including the edges in the pseudo pixels and the pseudo pixels including no edge in the pseudo pixels, and when the dot data transferred from the host device and the dot data generated by the printer halftone processor are present on the same pixel, the printing portion perform printing for the pixel by using the dot data transferred from the host device.

With the printing system, whether the pseudo pixels include the edges is not required to be determined by the assigning portion nor the transfer portion. Therefore, processing load of the host device is lower. It is to be noted that the printer halftone processor may or may not generate dot data of pixels constituting the pseudo pixels including the edges therein.

APPLICATION EXAMPLE 3

In the printing system according to Application Example 1 or Application Example 2, it is preferable that the transfer portion compress and transfer the representative values.

With the printing system, the data amount relating to the representative values can be made much smaller.

APPLICATION EXAMPLE 4

In the printing system according to Application Example 3, it is preferable that the host device include a changing portion which changes the representative values of the pseudo pixels including the edges in the pseudo pixels to values same as representative values of adjacent pseudo pixels.

With the printing system, the data amount relating to the representative values can be made even smaller. A data compression rate is higher as the same data is successive in many cases. Therefore, the representative values of the pseudo pixels including the edges therein are changed to the values same as the representative values of the adjacent pseudo pixels so that the compression rate becomes higher and the data amount becomes smaller. It is to be noted that the representative values of the pseudo pixels including the edges therein do not influence image quality even by changing the values thereof because they are not used for printing. The "adjacent pseudo pixels" indicates pseudo pixels which are adjacent data when compressed.

APPLICATION EXAMPLE 5

In the printing system according to any one of Application Example 1 to Application Example 4, it is preferable that the representative values be statistical values of color specification values of the plurality of pixels constituting the respective pseudo pixels.

With the printing system, the representative values can be calculated easily. Therefore, the time required for assignment can be reduced. As the statistical values, average values, maximum values, minimum values, or the like can be considered.

APPLICATION EXAMPLE 6

In the printing system according to any one of Application Example 1 to Application Example 5, it is preferable that the color specification values are values for indicating achromatic color.

With the printing system, the data amount of the representative values and the dot data by the host halftone processor becomes smaller in comparison with a case of color printing. Therefore, the time required for transferring data can be reduced.

APPLICATION EXAMPLE 7

In the printing system according to any one of Application Example 1 to Application Example 6, it is preferable that the host halftone processor select at least one of the pseudo pixels sharing a boundary as the edge and add pixels constituting the selected pseudo pixel to a target of halftone processing when the edge is present on the boundary between the pseudo pixels including no edge in the pseudo pixels.

With the printing system, printing with high image quality can be performed even if the edge is present on the boundary between the pseudo pixels.

APPLICATION EXAMPLE 8

A computer-readable medium on which are stored programs for a printing system including a host program to be executed by a host device, and a printer program to be executed by a printer which performs printing by using dot data indicating presence/absence of a dot for each pixel. In the program for the printing system, the host program causes the host device to execute a pseudo pixel generating procedure by grouping a plurality of pixels to generate pseudo pixels having resolution lower than resolution of the printer, an assigning procedure of assigning representative values which are determined based on color specification values assigned to the pixels constituting the pseudo pixels to the respective pseudo pixels including no edge in the pseudo pixels among the pseudo pixels, a host halftone processing procedure of executing halftone processing on the pixels constituting the pseudo pixels including the edges in the pseudo pixels among the pseudo pixels to generate the dot data, and a transfer procedure of transferring the representative values assigned by the assigning procedure and the dot data generated by the host halftone processing procedure to the printer, and the printer program causes the printer to execute printer halftone processing procedure of executing halftone processing on the representative values transferred from the host device to generate the dot data, and a printing procedure of performing printing by using the dot data generated by the printer halftone processing procedure and the dot data transferred from the host device.

With the printing system program, the same effects as those in Application Example 1 can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Printing System (FIG. 1, FIG. 2)

Figure 1:
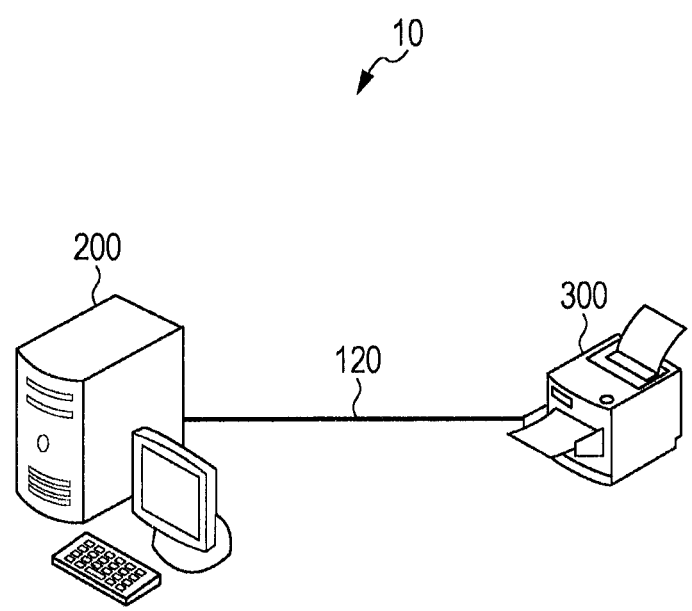
FIG. 1 is a view illustrating a configuration of a printing system.

FIG. 1 is a view for explaining the configuration of a printing system 10. The printing system 10 includes a host computer 200 and a printer 300. The host computer 200 and the printer 300 are connected to each other with a USB cable 120. The host computer 200 transfers data for printing (hereinafter, referred to as "print image data") to the printer 300. The printer 300 prints an image on a print medium at the resolution of 1440×720 dpi based on the print image data transferred from the host computer 200. The print image data is data obtained by converting display image data by a printer driver. The display image data is data for displaying an image on a display device 215 (which will be described later with reference to FIG. 2) included in the host computer 200. The display image data is data in an RGB format of 8 bits×3 primary colors per pixel and the resolution of the display image data is 720×720 dpi.

Figure 2:
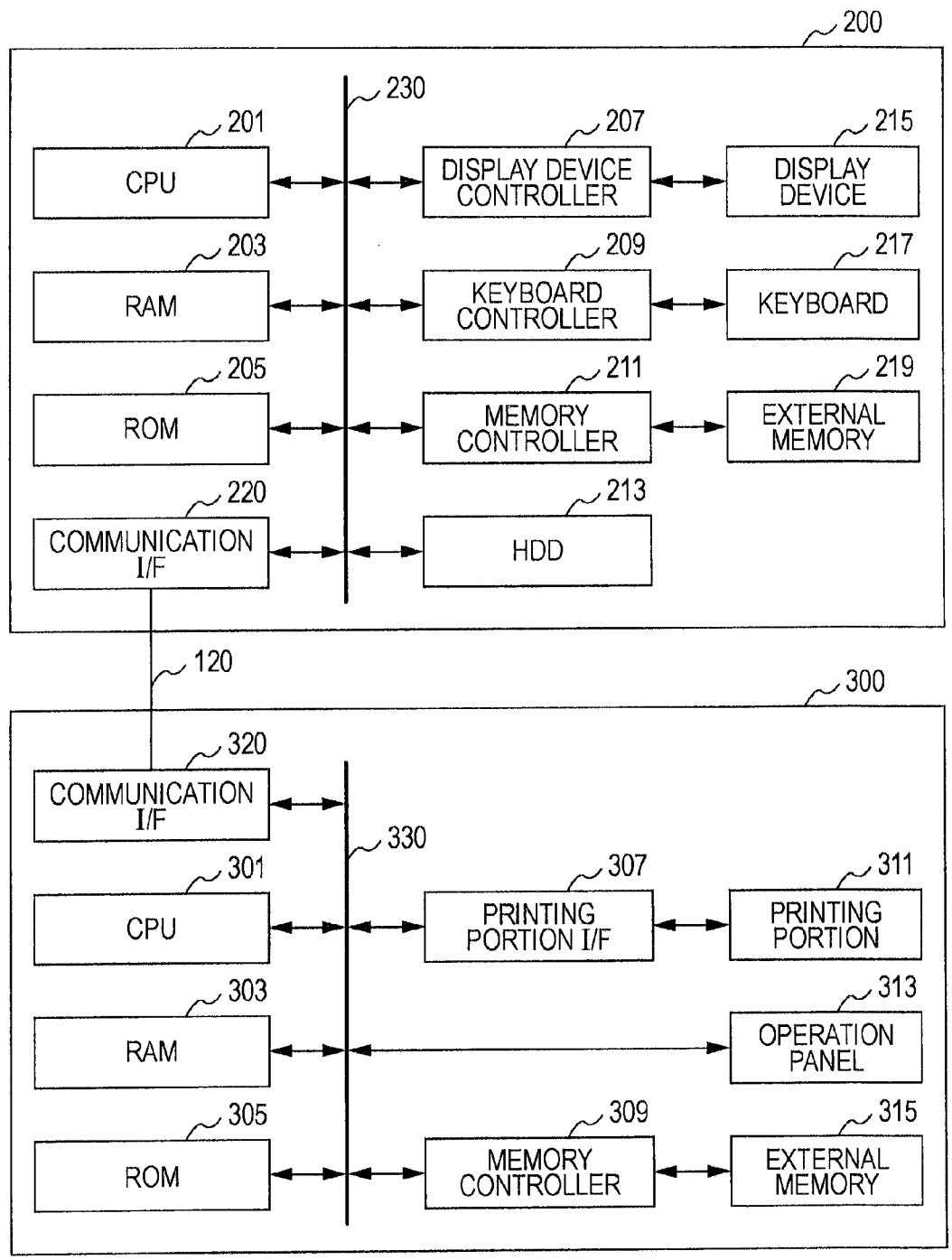
FIG. 2 is a diagram illustrating configurations of a host computer and a printer.

FIG. 2 is a diagram schematically illustrating configurations of the host computer 200 and the printer 300. The host computer 200 includes a CPU 201, a RAM 203, a ROM 205, a display device controller 207, a keyboard controller 209, a memory controller 211, a hard disk drive (HDD) 213, and a communication interface (I/F) 220. These constituent components are connected to one another through a bus 230. The display device 215 is connected to the display device controller 207. A keyboard 217 is connected to the keyboard controller 209, and an external memory 219 is connected to the memory controller 211. The USB cable 120 is connected to the communication I/F 220. In the embodiment, the standard of the communication I/F 220 and a communication I/F 320, which will be described later, is USB 2.0. The USB cable 120 is a cable compatible with USB 2.0. The CPU 201 loads programs stored in the HDD 213 on the RAM 203 and executes the programs in order to control the overall operations of the host computer 200.

On the other hand, the printer 300 is a line printer which performs printing by using inks of four colors of cyan (C), magenta (M), yellow (Y), and black (K). The printer 300 includes a CPU 301, a RAM 303, a ROM 305, a printing portion interface (I/F) 307, a memory controller 309, an operation panel 313, and the communication interface (I/F) 320. These constituent components are connected to one another through a bus 330. A printing portion 311 is connected to the printing portion I/F 307, and an external memory 315 is connected to the memory controller 309.

The CPU 301 loads programs stored on the ROM 305 and executes the programs in order to control the overall operations of the printer 300. The printing portion 311 is hardware which discharges ink onto a print medium to perform printing, such as an ink cartridge storing ink, a printing head, and a platen.

The operation panel 313 is a user interface on which a user performs settings and issues directions relating to printing. The settings are to set of types, sizes, and the like of a print medium. The directions indicate directions to start and stop printing, and the like.

The printer 300 uses dots of three different sizes of large dots, middle dots, and small dots when forming dots on a print medium. Therefore, as dot data, 8 bits of 2 bits×4 colors are necessary for per pixel.

Figure 5:
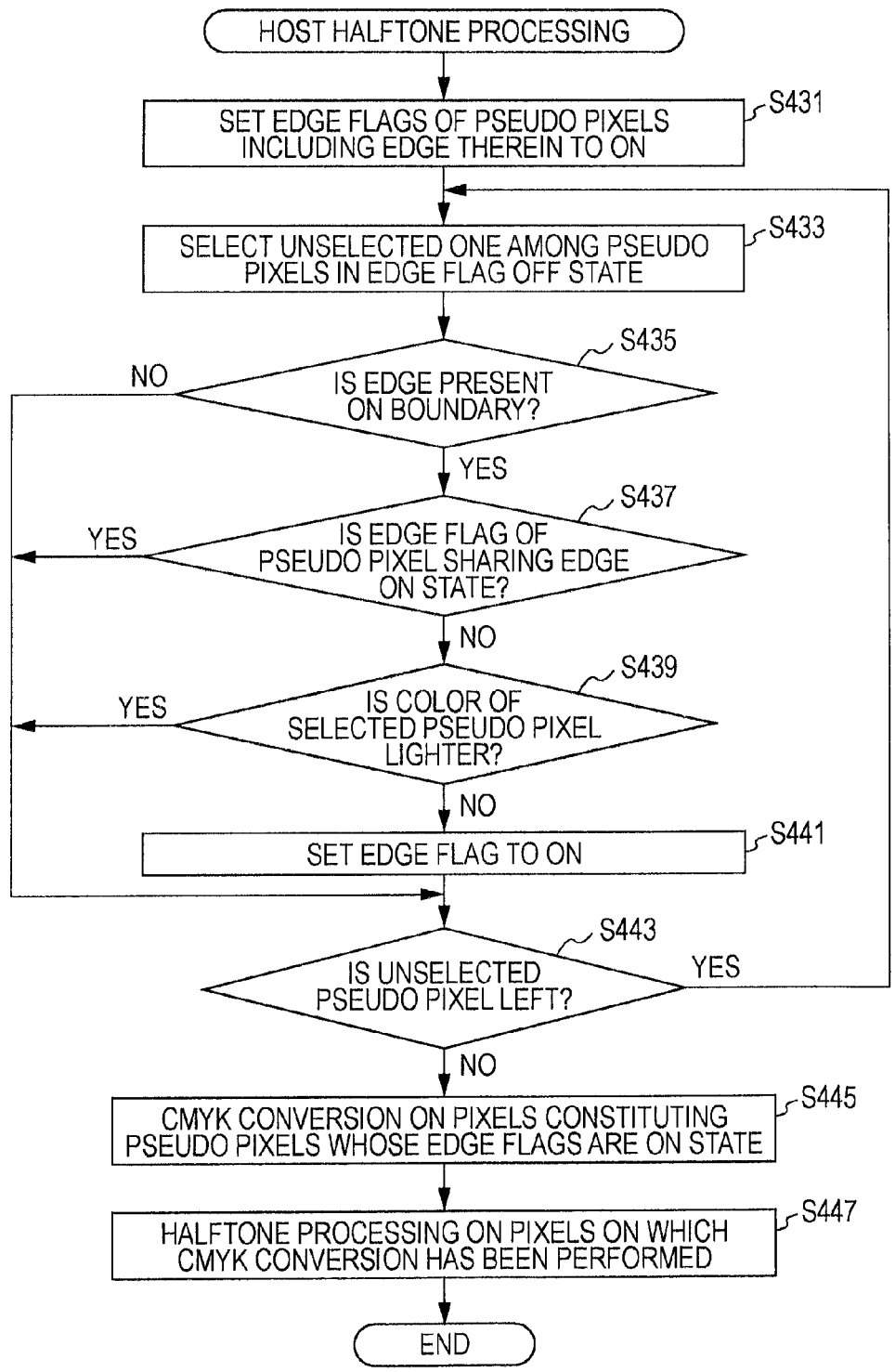
FIG. 5 is a flowchart illustrating host halftone processing.

2. Host-side Processing (FIG. 3, FIG. 5)

Figure 3:
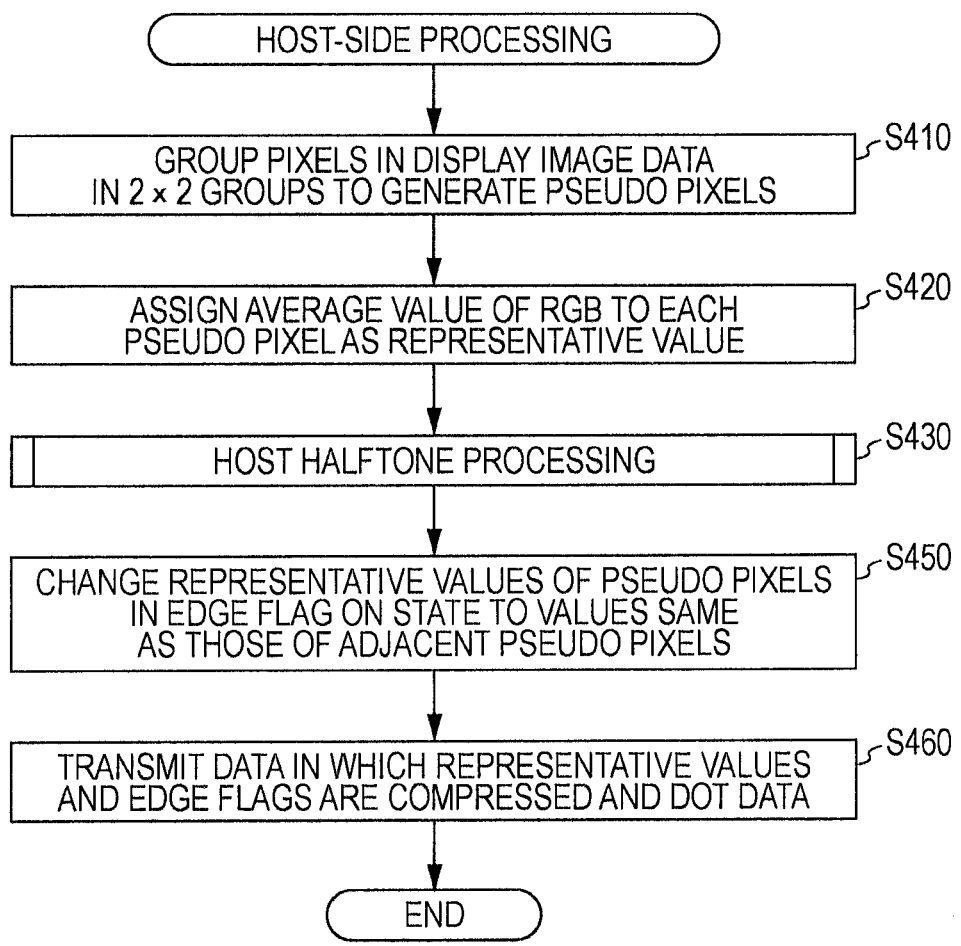
FIG. 3 is a flowchart illustrating host-side processing.

FIG. 3 is a flowchart illustrating host-side processing. The executing entity of the host-side processing is the CPU 201 included in the host computer 200. The processing is started when a direction to print is input through the operation panel 313.

Figure 4:
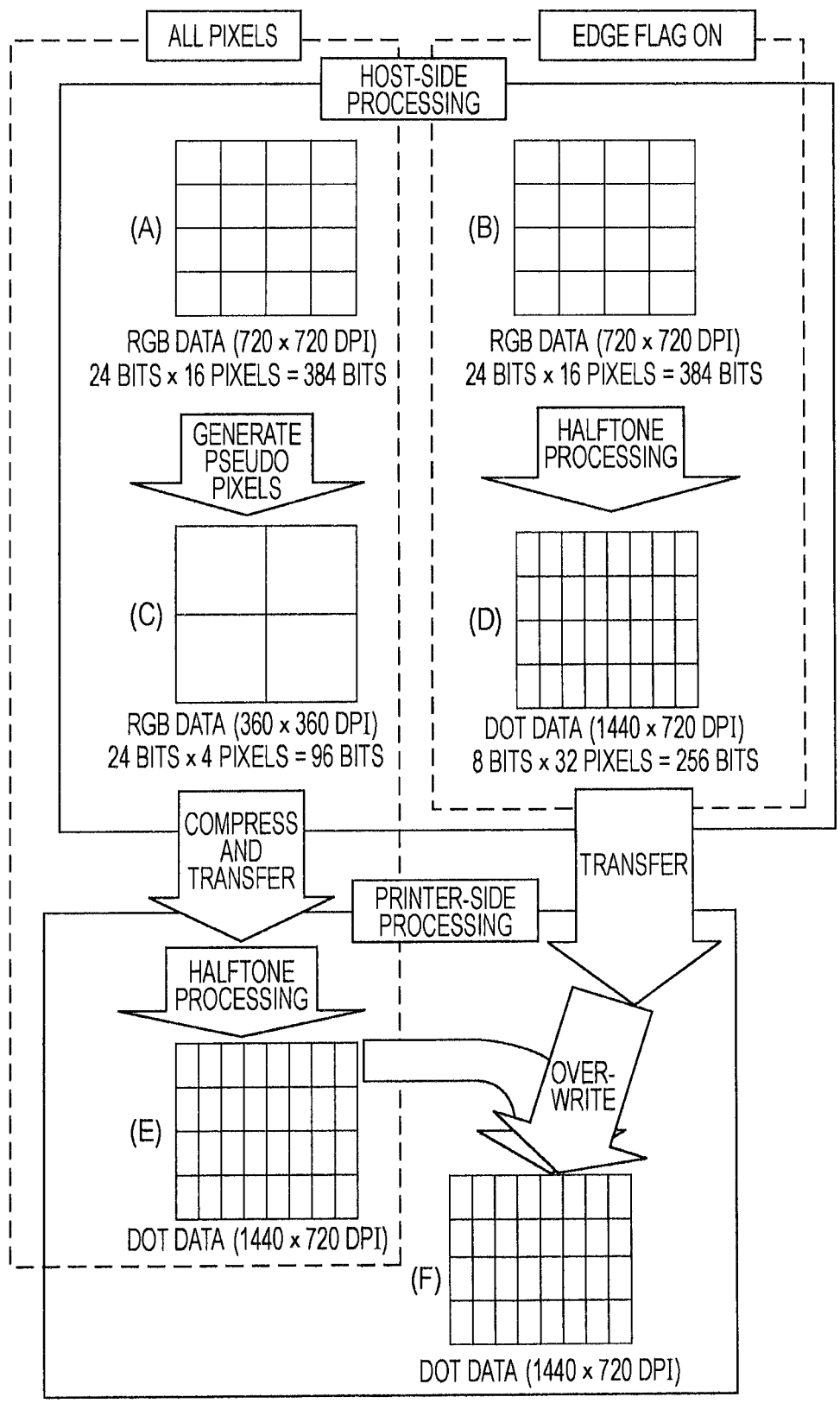
FIG. 4 is a view illustrating a state where data is converted.

FIG. 4 is a view illustrating a state where data is converted by the host-side processing and printer-side processing (which will be described later with reference to FIG. 6). (A) and (B) in FIG. 4 indicate 16 pixels of 4 pixels×4 pixels as a part of a number of pixels constituting the display image data. A data amount for 16 pixels is 384 bits of 8 bits×3 primary colors×16 pixels.

If the host-side processing is started, the CPU 201 groups the pixels of the display image data four by four to generate pseudo pixels (step S410). Each pseudo pixel is constituted by 2 pixels×2 pixels in matrix form. (C) in FIG. 4 indicates 4 pseudo pixels based on the 16 pixels. The resolution of the pseudo pixels is 360×360 dpi.

Next, a representative value is assigned to each pseudo pixel (step S420). The representative value indicates an average value of RGB values of the pixels belonging to each pseudo pixel. That is to say, information for an amount of one color is assigned to one pseudo pixel. A data amount of the pseudo pixels is 96 bits of 8 bits×3 primary colors×4 pixels and is smaller than 384 bits as the original value. Next, the host halftone processing is executed (step S430).

FIG. 5 is a flowchart illustrating the host halftone processing. At first, flags of pseudo pixels including edges therein (hereinafter, referred to as "internal edge pseudo pixel") are set to be in the ON state (step S431). An initial value of the edge flag is OFF. The expression "including edge" referred to herein indicates that the RGB values of the 4 pixels constituting each pseudo pixel are out of a predetermined range. The expression "out of predetermined range" referred to herein indicates a case where a difference between a maximum value and a minimum value for each of the three values of RGB is equal to or higher than 33 gradation values in 256 gradation values. That is to say, it is determined that the edge is included if even one of the RGB values has the difference between the maximum value and the minimum value, which is equal to or higher than 33 gradation values.

Subsequently, unselected one of pseudo pixels of which edge flags are in the OFF state is selected (step S433). The expression "unselected one" referred to herein indicates that step S433 is executed repeatedly by the number of pseudo pixels of which edge flags are in the OFF state and the pseudo pixels which have been selected in the past are excluded from the selection target.

Next, it is determined whether the edge is present on at least a part of a boundary of the selected pseudo pixel (step S435). Note that as the method of determining whether the edge is present, one pixel and a pixel sharing the boundary of the pseudo pixel together with the pixel are compared with each other. As the method of comparing the pixels, it is determined whether the difference between the maximum value and the minimum value for each of the three values of RGB is equal to or lower than 32 gradation values in 256 gradation values as in the case of the internal edge pseudo pixel.

When the edge is present on the boundary (step S435, Yes), it is determined whether the edge flag of the pseudo pixel sharing the edge is in the ON state (step S437). When the edge flag is in the OFF state (step S437, No), it is determined whether a color defined by the representative value of the selected pseudo pixel is lighter than a color defined by the representative value of the pseudo pixel sharing the edge (that is, brightness is higher) (step S439). When the selected pseudo pixel is not determined to be lighter (the selected pseudo pixel is darker or the same) (step S439, No), the edge flag of the selected pseudo pixel is set to be in the ON state (step S441) and the process proceeds to step S443.

On the other hand, when the edge is not present on the boundary of the selected pseudo pixel (step S435, No), the edge flag of the pseudo pixel sharing the edge is in the ON state (step S437, YES), or the color defined by the representative value of the selected pseudo pixel is lighter than the color defined by the representative value of the pseudo pixel sharing the edge (step S439, YES), step S441 is not executed, the edge flag of the selected pseudo pixel is kept to be in the OFF state, and the process proceeds to step S443.

As described above, step S433 to step S441 are performed for setting the edge flag of the pseudo pixel including the edge on the boundary thereof (hereinafter, referred to as "boundary edge pseudo pixel") to be in the ON state. The processing is performed in order to improve edge reproducibility. Therefore, not all the edge flags of the boundary edge pseudo pixels may be set to be in the ON state and it is sufficient that the edge flag of any one of the boundary edge pseudo pixels sharing the edge is set to be in the ON state. Therefore, if the edge pseudo pixel sharing the edge is the internal edge pseudo pixel, the edge flag of the selected pseudo pixel is not required to be changed to be in the ON state. On the other hand, when both of the pseudo pixels are not internal edge pseudo pixels, any one of the pseudo pixels is selected. The pseudo pixel to be selected is a darker one as described above at step S441. The darker one, that is, the pseudo pixel on which the ink dot having a larger area is formed is selected, thereby improving edge reproducibility.

If the process proceeds to step S443, it is determined whether the pseudo pixel unselected at step S433 is left. If the unselected pseudo pixel is left (step S443, Yes), the process returns to step S433.

If all the pseudo pixels other than the internal edge pseudo pixels have been selected (step S443, No), CMYK conversion is executed on the pixels constituting the pseudo pixels of which edge flags are in the ON state (hereinafter, referred to as "edge-ON pseudo pixels") (step S445). The CMYK conversion is executed by referring to a conversion LUT stored in the ROM 205 and performing interpolation for data which is not present on the LUT.

Subsequently, the halftone processing is executed on the pixels on which the CMYK conversion has been performed (step S447), and the host halftone processing is finished. Dot data with the resolution of 1440×720 dpi as the resolution of the printer is generated by the halftone processing. It is to be noted that an error diffusion method is used for the halftone processing. If the error diffusion method is used, in particular, image quality of the pixels constituting the boundary edge pseudo pixels becomes preferable.

(D) in FIG. 4 indicates 32 pixels as a part of a number of pixels constituting the dot data generated by the halftone processing at step S445. A data amount of the dot data for 32 pixels is 256 bits of 2 bits×4 colors×32 pixels.

Next, the representative values of the edge-ON pseudo pixels are changed to values same as those as adjacent pseudo pixels (step S450). The adjacent pseudo pixel is an adjacent pseudo pixel at the left side in principle and is an adjacent pseudo pixel at the right side when the adjacent pseudo pixel at the left side is not present (the edge-ON pseudo pixel is at the left end). The step is performed in order to improve a compression rate of compression by the Huffman coding technique at subsequent step S460. The adjacent pseudo pixel at the left side is selected as the adjacent pseudo pixel in accordance with permutation of the Huffman coding technique.

Subsequently, the representative values and the edge flags of all the pseudo pixels are compressed by the Huffman coding technique and are transferred to the printer 300, and the dot data generated by the halftone processing is transferred to the printer 300 (step S460). Then, the host-side processing is finished. The three types of data constitute the print image data as described above.

3. Printer-side Processing (FIG. 6)

Figure 6:
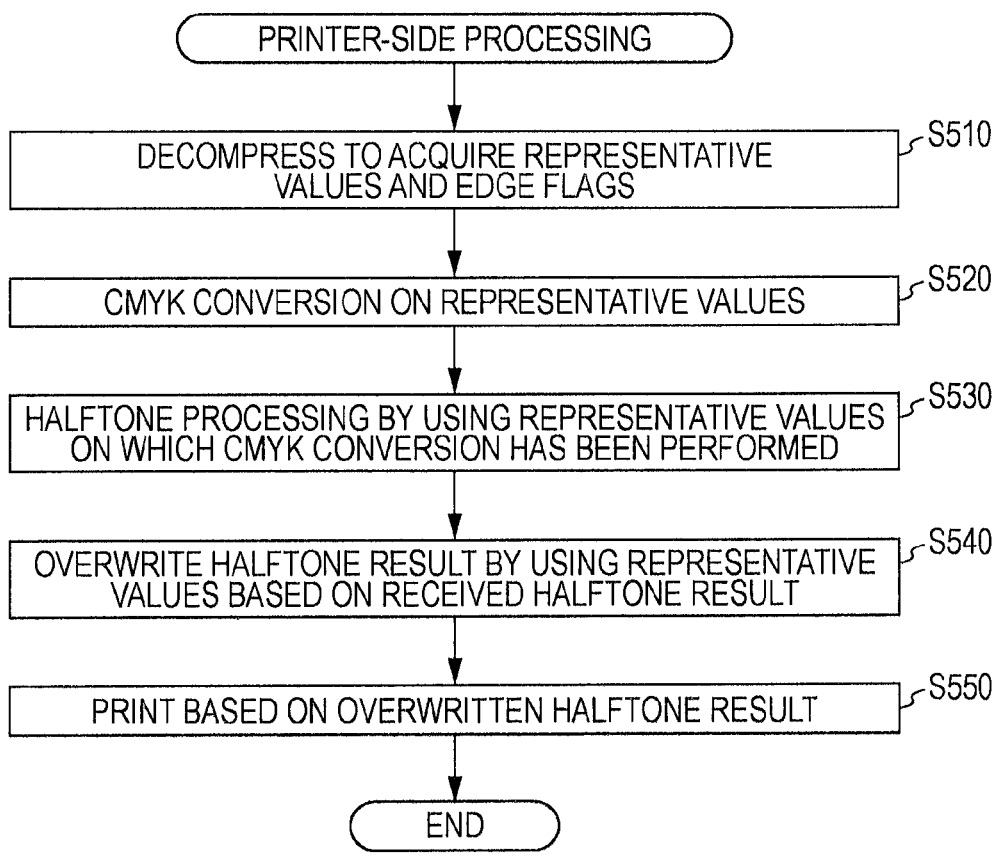
FIG. 6 is a flowchart illustrating printer-side processing.

FIG. 6 is a flowchart illustrating the printer-side processing. The executing entity of the printer-side processing is the CPU 301 included in the printer 300. The processing is started when the transferring of the print image data is received from the host computer 200.

At first, the representative values and the edge flags are acquired by decompression of the transferred compressed data (step S510). Next, the CMYK conversion is performed on the representative values (step S520). The CMYK conversion is executed by referring to the conversion LUT stored in the ROM 305. The conversion LUT is the same as that stored in the ROM 205 of the host computer 200.

Next, the halftone processing is executed by using the representative values on which the CMYK conversion has been performed (step S530). Dot data of 1440×720 dpi is also generated in the halftone processing. (E) in FIG. 4 indicates 32 pixels as a part of a number of pixels constituting the dot data generated by the halftone processing at step S530.

Subsequently, the dot data generated based on the representative values is overwritten by the dot data transferred from the host computer 200 (step S540). The overwriting is performed on the pixels constituting the edge-ON pseudo pixels. (F) in FIG. 4 indicates 32 pixels as a part of a number of pixels constituting the dot data generated at step S540.

Finally, printing is performed based on the dot data generated as a result of the overwriting (step S550), and the printer-side processing is finished.

4. Effects

With the printing system 10, the time it takes to transfer the print image data from the host computer 200 to the printer 300 can be reduced. This is because the data amount of the print image data in the embodiment is smaller than that of the dot data of all the pixels and the data in the RGB format.

As described above, the print image data is data in which the representative values and the edge flags of all the pseudo pixels are compressed and the dot data of the pixels constituting the edge-ON pseudo pixels. The data amount of the print image data depends on a ratio of the number of edge-ON pseudo pixels in the number of all the pseudo pixels. That is to say, as the ratio is smaller, the data amount of the print image data is smaller because the compression rate of the edge flags is higher and the data amount of the dot data of the pixels constituting the edge-ON pseudo pixels is smaller since target pixels are reduced. Therefore, how small the data amount of the print image data cannot be determined in a wholesale manner. However, a region including no edge (so-called solid region) occupies a large portion of a common image. Accordingly, in general, the data amount of the print image data is much smaller than that of the dot data of all the pixels.

Further, the representative values of the edge-ON pseudo pixels are changed to the values same as those as adjacent pseudo pixels so as to improve the compression rate. As a result, the data amount of the print image data is further made smaller.

Thus, the printing based on the print image data is performed with high image quality while making the data amount smaller in the above manner because printing is performed without lowering the resolutions on the edges. On the other hand, the resolution on the solid region is lowered, but color change is small on the solid region so that the low resolution is not easily recognized visually.

5. Correspondence Relationship Between Embodiment and Application Examples

Step S410 corresponds to software for realizing a pseudo pixel generating portion, step S420 corresponds to software for realizing an assigning portion, step S430 corresponds to software for realizing a host halftone processor, step S450 corresponds to software for realizing a changing portion, step S460 corresponds to software for realizing a transfer portion, step S530 corresponds to software for realizing a printer halftone processor, and step S540 and step S550 correspond to software for realizing a printing portion.

6. Other Embodiments

The invention is not limited to the above-mentioned embodiment and can be executed in various modes within the technical spirit of the invention. For example, additional constituent components in the embodiment can be omitted from the embodiment. The additional constituent components referred to herein are components corresponding to matters which are not specified in Application Examples which are independent substantively. For example, the following embodiments may be employed.

The print image data may be data for monochrome printing. In this case, the print image data is data for expressing achromatic color. Therefore, the data amount of the print image data becomes much smaller.

The size of each pseudo pixel (the number of pixels constituting the pseudo pixel) may be different from that in the above-mentioned embodiment. However, the resolution of the pseudo pixels is preferably lower than the resolution of the dot data for making the data amount of the print image data smaller. On the other hand, when the resolution of the pseudo pixels is significantly low, it is considered that a ratio of the edge-ON pseudo pixels is larger and the data amount is not made smaller. The size of each pseudo pixel is preferably determined in view of the above-described conditions.

The edge flags of the boundary edge pseudo pixels may not be changed to be in the ON state. In the case of the embodiment, step S433 to step S443 are omitted. With this, processing load by the host computer 200 is reduced.

A dither method with simple processing at high speed may be used instead of the error diffusion method.

When the dither method is used, the same dither mask is preferably used for the host computer 200 and the printer 300. If the same dither mask is used, the edge-ON pseudo pixels and the pseudo pixels of which edge flags are in the OFF state can be connected smoothly so as to suppress generation of pseudo contours. As the dither mask, a blue noise mask method by using a mask having a huge size with blue noise characteristics is preferably used.

The definition of the edge may be different from that in the above-mentioned embodiment. For example, whether the edge is present may be determined in the following manner. That is, the RGB values are used to resemble three-dimensional coordinate values, a distance between colors to be compared is calculated, and whether the distance is equal to or larger than a predetermined value is determined.

When a transfer speed is expected to be low or the data amount of the print image data is expected to be large (for example, when many characters are included), the determination may be made strictly for reducing the edge-ON pseudo pixels.

A threshold value of the edge may be increased or decreased in accordance with input from a user. For example, when a high image quality mode has been selected, the determination may be made leniently for increasing the edge-ON pseudo pixels. Further, when a high-speed print mode has been selected, the determination may be made strictly for reducing the edge-ON pseudo pixels.

The pixels constituting the edge-ON pseudo pixels may not be set to the targets of the halftone processing by the printer 300. This is because the pixels constituting the edge-ON pseudo pixels are not used for printing even when the halftone processing is executed thereon.

It is preferable that a process of diffusing "diffusion error from near processed pixels" on near unprocessed pixels be executed for the pixels on which the error has been diffused from an edge block among the pixels near the edge block. With this, error which has been diffused to non-edge block pixels from the edge block pixels is not neglected and a part of the error is diffused to the pixels constituting another edge-ON pseudo pixel again so that the edge reproducibility is further improved.

Further, in the edge block processing by the host computer 200, employment of the error diffusion method excellent in the edge reproducibility is effective. On the other hand, in the non-edge block processing by the printer 300, employment of the blue noise mask method as the dither method with which dot arrangement close to that with the error diffusion method is obtained is effective, in particular. There is a problem in the blue noise mask method that edge reproducibility on the intermediate gradation is deteriorated in comparison with that with the error diffusion method. However, the disadvantage is removed with this configuration and the non-edge block occupying a large part of data is processed by the dither method at high speed. Therefore, a high processing speed and high image quality are realized at the same time.

Further, in this case, a pseudo contour due to the halftone switching is generated between the edge block and the non-edge block in some cases. In order to suppress the generation of the pseudo contour, it is effective that the error diffusion process like the error diffusion method is executed for the non-edge block near the edge block after the processing at step S530. In the error diffusion process, the error is calculated by using the halftone result to be diffused to the nearby unprocessed pixels.

The representative values may not be average values but may be another statistical values and may, for example, be maximum values, minimum values, or the like. Alternatively, the representative values may not be statistical values, and values of upper left pixels may be employed as the representative values all the time, for example.

The representative values to be transferred may be CMYK values. For example, the host computer 200 may perform the CMYK conversion on the representative values after determining the representative values in the RGB format. Alternatively, the host computer 200 may determine the representative values after performing the CMYK conversion on the RGB values of respective pixels. When the host computer 200 performs the CMYK conversion on the RGB values of the respective pixels in this manner, the edge determination may be made based on the CMYK values.

The host computer 200 may execute the processing for assigning the representative values and the processing for generating the dot data in parallel.

The transferring of the representative values may be omitted for the edge-ON pseudo pixels.

The compression method may be not the Huffman coding technique and may be a run-length technique, for example. Further, an irreversible compression method such as a JPEG method may be employed.

The printer 300 may be a serial printer.

The entire disclosure of Japanese Patent Application No. 2011-262643, filed Nov. 30, 2011 is expressly incorporated by reference herein.

What is claimed is:

1. A printing system comprising:
    a host device; and
    a printer which performs printing by using dot data indicating presence/absence of dot formation for each pixel,
    wherein the host device includes:
        a pseudo pixel generating portion which groups a plurality of pixels to generate pseudo pixels;
        an assigning portion which assigns representative values to which color specification values of pixels constituting the pseudo pixels are reflected to the respective pseudo pixels including no edge in the pseudo pixels;
        a host halftone processor which executes halftone processing on the pixels constituting the pseudo pixels including the edges in the pseudo pixels to generate the dot data; and
        a transfer portion which transfers the representative values assigned by the assigning portion and the dot data generated by the host halftone processor to the printer,
    and the printer includes:
        a printer halftone processor which executes halftone processing on the representative values transferred from the host device to generate the dot data; and
        a printing portion which performs printing by using the dot data generated by the printer halftone processor and the dot data transferred from the host device.

2. The printing system according to claim 1,
    wherein the assigning portion assigns the representative values to the respective pseudo pixels including the edges in the pseudo pixels in addition to the pseudo pixels including no edge in the pseudo pixels among the pseudo pixels, the transfer portion transfers the representative values assigned to the pseudo pixels including the edges in the pseudo pixels and the pseudo pixels including no edge in the pseudo pixels, and when the dot data transferred from the host device and the dot data generated by the printer halftone processor are present on the same pixel, the printing portion performs printing for the pixel by using the dot data transferred from the host device.

3. The printing system according to claim 1, wherein the transfer portion compresses and transfers the representative values.

4. The printing system according to claim 3, wherein the host device includes a changing portion which changes the representative values of the pseudo pixels including the edges in the pseudo pixels to values same as representative values of adjacent pseudo pixels.

5. The printing system according to claim 1, wherein the representative values are statistical values of color specification values of the pixels constituting the respective pseudo pixels.

6. The printing system according to claim 1, wherein the color specification values are values for indicating achromatic color.

7. The printing system according to claim 1, wherein the host halftone processor selects at least one of the pseudo pixels sharing a boundary as the edge and adds pixels constituting the selected pseudo pixel to a target of the halftone processing when the edge is present on the boundary between the pseudo pixels including no edge in the pseudo pixels.

8. A non-transitory computer-readable medium on which are stored programs for a printing system, comprising:

a host program to be executed by a host device; and a printer program to be executed by a printer which performs printing by using dot data indicating presence/absence of a dot for each pixel, wherein the host program causes the host device to execute:

a pseudo pixel generating procedure by grouping a plurality of pixels to generate pseudo pixels having resolution lower than resolution of the printer;

an assigning procedure of assigning representative values which are determined based on color specification values assigned to the pixels constituting the pseudo pixels to the respective pseudo pixels including no edge in the pseudo pixels among the pseudo pixels;

a host halftone processing procedure of executing halftone processing on the pixels constituting the pseudo pixels including the edges in the pseudo pixels among the pseudo pixels to generate the dot data; and a transfer procedure of transferring the representative values assigned by the assigning procedure and the dot data generated by the host halftone processing procedure to the printer, and the printer program causes the printer to execute:

a printer halftone processing procedure of executing halftone processing on the representative values transferred from the host device to generate the dot data; and a printing procedure of performing printing by using the dot data generated by the printer halftone processing procedure and the dot data transferred from the host device.

* * * * *